United States Patent [19]
Seligman et al.

[11] 3,872,284
[45] Mar. 18, 1975

[54] SHIPS INERTIAL NAVIGATION STORAGE AND RETRIEVAL SYSTEM (SINSARS)

[75] Inventors: Herbert L. Seligman, Brooklyn; Marvin Schwartz, Queens; Warren Diamond, New York, all of N.Y.

[73] Assignee: The United States of America as represented by the Secretary of the Navy, Washington, D.C.

[22] Filed: Sept. 18, 1972

[21] Appl. No.: 289,920

[52] U.S. Cl. ...... 235/150.27, 73/178 R, 235/150.25, 235/150.26, 340/172.5
[51] Int. Cl. ...................... G01c 21/20, G06f 15/50
[58] Field of Search..... 235/150.25, 150.26, 150.27, 235/153, 173; 340/172.5; 73/178 R; 33/318

[56] References Cited
UNITED STATES PATENTS

| | | | |
|---|---|---|---|
| 3,428,789 | 2/1969 | Richard | 235/150.25 |
| 3,453,601 | 7/1969 | Bogert et al. | 340/172.5 |
| 3,535,696 | 10/1970 | Webb et al. | 340/172.5 |
| 3,675,210 | 4/1972 | Block et al. | 340/172.5 |
| 3,721,813 | 3/1973 | Condon et al. | 340/172.5 |

OTHER PUBLICATIONS

Otten: A look into Strap Down Guidance Design I & II. I. Oct. 1966 pages 61–67; II. Nov. pages 71–77. Control Engineering.

*Primary Examiner*—Felix D. Gruber
*Attorney, Agent, or Firm*—Richard S. Sciascia; Arthur A. McGill; Prithvi C. Lall

[57] ABSTRACT

A system for storing and retrieving the outputs of inertial sensors (accelerometers) and of other appropriate quantities such as EM Log Data (velocity reference), time, gimbal angle information and depth gauge data (depth reference aboard a submarine) of an inertial system, in order to be able to continue navigation with reasonable accuracy at some future time after a system failure without the need of external information to re-initialize the solution of the navigation problem. The system comprises an inertial measuring unit (IMU), a navigation computer, a memory unit, and an electronic switching and timing unit. Sensor information from the inertial measuring unit (IMU) is stored temporarily during non-availability of the navigation computer. The sensors of the inertial measuring unit continue to supply information for storage during the time the navigation computer is inoperative without requiring command and/or control information from the computer. The navigation computer processes the sensor information stored during its failure at a rate faster than that of real time data processing until it has processed all of the stored sensor information. The navigation computer goes into its normal processing mode thereafter. Thus accurate navigation is continued without the submarine coming to the surface for resets (reference information).

2 Claims, 1 Drawing Figure

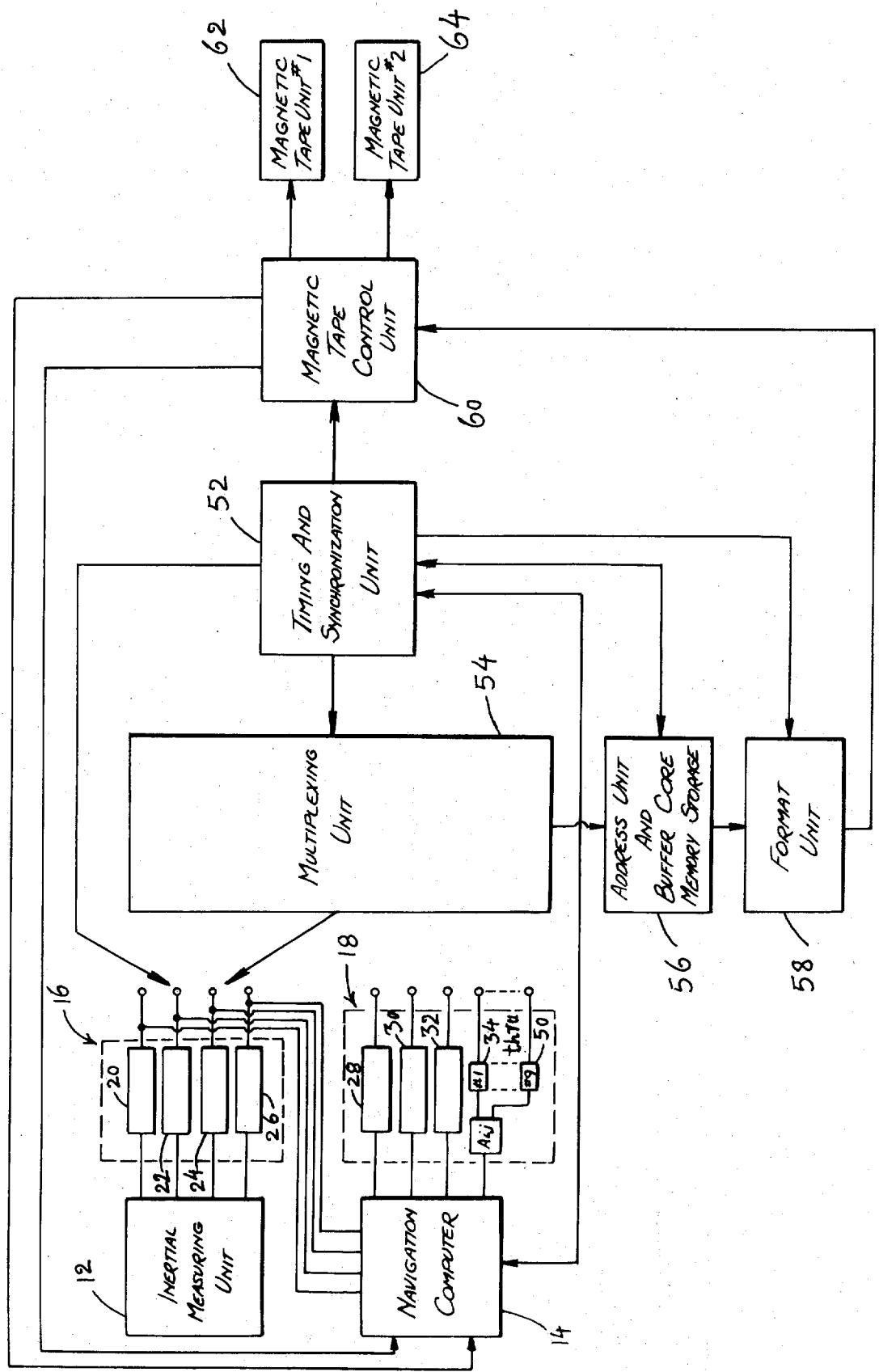

SHIPS INERTIAL NAVIGATION STORAGE AND RETRIEVAL SYSTEM (SINSARS)

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an inertial navigation system and more specifically to a Ships Inertial Navigation Storage and Retrieval System, hereinafter called SINSARS.

Inertial navigation systems require resets (reference information) periodically in order to provide position and velocity information to the required accuracy. In general, whenever an inertial system has failed and has been repaired, it requires a reset (reference information) to re-initialize the system in order to provide accurate navigation information. The configuration employing Electrically Suspended Gyros (ESG) being considered as a long-term inertial navigation system for submarine application is the Space Stable Configuration. The ESG Space Stable Configuration has the unique characteristics that the navigation computer does not have to provide feedback information to the inertial instruments. The inertial platform orientation to the computer frame is mathematically compensated for in the computer.

Efforts have been made to determine the dependence of the Space Stable System on the availability of a navigation computer. One such investigation indicated that with the availability of the DRAI and MK 19 gyro compass, the computer could be out of service up to one hour and still continue to navigate with reasonable performance and without the need for the submarine to come to the surface to obtain a position fix or reference information to re-initialize the system. However, for failures involving periods greater than one hour, performance degradation becomes a significant, thus requiring fixes or reference information by coming to the surface to restore accuracy in navigation.

SUMMARY OF THE INVENTION

The objects and advantages of the present invention are accomplished by utilizing an improved method of continuing accurate navigation covertly subsequent to a failure and repair of the navigation computer and other parts of the system. This is accomplished by storing the critical navigation information on magnetic tapes or other mass storage devices aboard ship, reading the stored data back into the computer after repairs have been effected, and processing this data at a faster rate than that of real time data processing until the computer is ready to process the real time data from the inertial sensors.

An object of this invention is to continue accurate navigation covertly subsequent to a failure of the navigation computer.

Another object is to extend the time interval during which the submarine can be navigated accurately without coming to the surface and thus allowing sufficient time to make repairs and bring the navigation computer back to operation.

Other objects, advantages and novel features of the invention will become apparent from the following detailed description when considered in conjunction with the accompanying drawing, the single FIGURE of which illustrates, in block diagram, a Ships Inertial Navigation Storage and Retrieval System constructed in accordance with the teachings of the present invention.

DESCRIPTION OF A PREFERRED EMBODIMENT

A preferred embodiment of the ships inertial navigation storage and retrieval systems (SINSARS) comprises an inertial measuring unit 12, hereinafter called IMU, which contains the ESG Gyros (Electrically Suspended Gyros) and accelerometers and the associated gimbals properly mechanized to stabilize the inertial sensors in an inertial reference frame consistent with the selected computation frame of a navigation computer 14. IMU 12 provides acceleration and gimbal angle information simultaneously to group 16 of buffer registers and to the navigation computer 14. Associated inputs to the navigation computer 14 needed to generate navigation information, are EM Log (velocity reference) data, depth gauge data, and position reference information periodically obtained from an external reference device such as navigation satellites. As shown in the drawing the desired data from appropriate sensors is transferred to group 16 of buffer registers and the output information from the navigation computer 14 is transferred to group 18 of buffer registers. Group 16 of buffer registers store accelerometers information in the buffer registers 20, 22 and 24 and gimbal angle information in buffer register 26. In group 18 of buffer registers, time information generated internally inside the navigation computer 14 is transferred to buffer register 28; velocity information from an EM Log instrument (velocity reference) is transferred to buffer register 30 after being digitalized by the navigation computer 14; depth gauge information from a depth gauge is transferred to buffer register 32 after being digitalized by the navigation computer 14; and information regarding different elements of $A_{ij}$ matrix, which gives a relationship between the inertial frame and the platform where accelerometers are mounted, is transferred to nine buffer registers 34 through 50. This data transfer is accomplished under the control of a timing and synchronization unit 52 which is connected to groups 16 and 18 of buffer registers and interconnected to the navigation computer. The timing and synchronization unit 52 is also connected to a multiplexing unit 54 to command the operation thereof. Upon command from the timing and synchronization unit 52, the multiplexing unit 54 samples data transferred to each of the buffer registers in sequence in a cyclic fashion, preferably each cycle lasting about one-eighth of a second. The multiplexing unit 54 is basically an electronically controlled switch, being movably connected to groups 16 and 18 of buffer registers and to a temporary core storage unit 56, which provides a means of transferring the data to the temporary core storage unit 56 which is interconnected with the timing and synchronization unit 52 and connected to a format unit 58. Unit 56 consists of two parts; an addressing unit and a standard memory unit, preferably a 4K memory unit. The addressing unit is incremented and reset by the timing and synchronization unit 52. Each of the buffer registers in groups 16 and 18 has the same number of bits, preferably 32 bits. On command from the timing and synchronization unit 52, a fixed bit word, preferably a 32 bit word, is transferred from buffer registers through the multiplexing unit 54 and is stored in the core storage word selected by the addressing unit. When the temporary core storage unit 56 is filled, a signal is transmitted to the timing and synchronization unit 52 via the communication lines between the temporary core storage unit 56 and the timing and synchronization unit 52. This signal activates circuitry energizing a magnetic tape control unit 60 which is connected to the timing and synchronizing unit 52 and to magnetic tape units 62 and 64. The data stored in the temporary storage unit 56 is thus stored on magnetic tapes 62 and 64. Magnetic tape unit 62 is preferably used for storing the data when the navigation computer 14 fails, whereas magnetic tape unit 64 is used for storing data when the navigation computer is processing data stored on magnetic tape 62 during an inoperative period of the navigation computer 14. After a sufficient delay to permit tape control unit 60 to reach its operational speed, a signal is forwarded from the timing and synchronization unit 52 to initiate the transfer of data from the temporary core storage unit 56 to format unit 58. The format unit 58 reduces the word size of the temporary core storage unit 56 to make it compatible with the storage capabilities of magnetic tape units 62 and 64. As an example, digital tape units are generally designed to store eight bit words and a parity bit across a half an inch width of the tape. As a result, 32 bit words stored in format unit 58 have to be broken into four tape words and a parity bit added to each tape word. Then the data is transferred from format unit 58 to tape units 62 and 64 and stored on the tapes. The magnetic tape control unit 60 is also in communication with navigation computer 14 as shown. Timing and synchronization unit 52 is also in communication with the navigation computer 14.

OPERATION OF THE SYSTEM

Under normal conditions, inertial information from IMU 12 and information regarding velocity, depth and position is fed to the navigation computer 14, which in turn transfers time velocity depth and position data to various buffer registers of group 18 providing a navigation information to the submarine for accurate navigation. Inertial information from IMU 12 is also transferred to the buffer registers of group 16 at the same time. When the navigation computer 14 fails, a signal from the navigation computer 14 is sent to timing and synchronization unit 52, which in turn sends a signal to the multiplexing unit 54. Multiplexing unit 54, on command from the timing and synchronization unit 52, starts sampling data transferred to the buffer registers in groups 16 and 18 in succession and stores this information in buffer core memory storage unit 56. A signal from the timing and synchronization unit 52 generated at the time of failure of navigation computer 14 commands the temporary core storage unit 56 to send data to the format unit 58. At the same time a signal from timing and synchronization unit 52 generated at the time of failure of navigation computer 14 activates magnetic tape control unit 60. format unit 58 then stores the data from the temporary core storage unit 56 to magnetic tape unit 62. This data is stored until the navigation computer 14 is repaired. When the navigation computer 14 is repaired, the data stored on magnetic tape 62 is fed back into the navigation computer 14 by rewinding magnetic tape 62 to the start position and reading it. The blocks of data recorded on the magnetic tape 62 are read back into the navigation computer 14 one at a time and processed as fast as the navigation computer 14 can. Normally the navigation computer 14 must wait for data from IMU 12 for processing. However, in the mode subsequent to the failure and repair of the navigation computer 14, the data transferred from the tape devices to navigation computer 14 is much faster than the normal time to transfer data from the IMU 12 to the navigation computer 14 for processing. This permits the computer to process data faster than real time, hence enabling the navigation system to catch up to the period where real time data processing can be resumed with no loss of navigation information and accuracy. The buffer registers are then reset by a signal initiated in timing and synchronization unit 52 to make them available for use subsequent to a future failure of the navigation computer.

The system can be made to allow any feasible time for navigation computer repair to be completed. As an example, a time period of 24 hours was allowed in this preferred embodiment of the invention. Since the time for the multiplexing unit to complete one cycle is preferably set to be ⅛ sec, a total of 691,200 cycles are required to sample all the data stored during 24 hour period. In this particular case, each cycle of sampling of data by the multiplexing unit takes 10 millisec when the navigation computer is processing data at its fastest rate, and it takes about two hours to process the data stored in the 24 hour period. The data stored in the two hour period during which the navigation computer was processing previously stored data can then be processed in about 10 minutes. This operation continues until navigation computer catches up. Then the navigation computer is made to go in the mode where its processing speed corresponds with the real time data processing speed.

In the preferred embodiment described above, the IMU 12 was an electrically suspended gyro navigator, preferably Honeywell Model H-462; the navigation computer 14, preferably Honeywell Model DDP516-05, the buffer registers were standard logic cards, preferably Series C-150T Logic Cards manufactured by Control Logic, Inc.; the multiplexing unit, format unit, and timing and synchronization unit were manufactured by Control Logic, Inc.; magnetic tape control unit preferably Honeywell Model 516-4100; magnetic tape units preferably Honeywell Model 516-4130; and temporary core storage 56 preferably Honeywell Model DDP516 series memory. However, it should be clearly understood that the scope of the invention is not limited to the use of the units enumerated above. Any other compatible set of units also may be used. It should be further understood that the basic concept used in developing the SINSARS can be applied to other real time computerized systems wherein: (1) sensor information can be temporarily stored during non-availability of the computer; (2) sensors do not require command and/or control information from the computer; and (3) the capability for faster than real time data processing of the stored information exists.

Obviously many modifications and variation of the present invention are possible in the light of the above teachings. It is therefore to be understood that within the scope of the appended claims the invention may be practiced otherwise than as specifically described.

We claim:

1. A ships inertial navigation storage and retrieval system comprising:
   an inertial measuring unit;
   a first plurality of buffer registers, said first plurality registers being connected to the output of said inertial measuring unit;
   a navigation computer, said computer being connected to said inertial measuring unit for transferring inertial information from said inertial measuring unit to said navigation computer via said first plurality of buffer registers and said navigation computer having the capability of different rates of information processing and processing velocity, depth, and position information;
   a second plurality of buffer registers, said second plurality of registers being connected to said navigation computer for transferring processed navigation information from said navigation computer to said second plurality of buffer registers;
   a multiplexing unit, said multiplexing unit being connected to said first plurality and to said second plurality of buffer registers;
   a timing and synchronization unit connected to said multiplexing unit and said first plurality and second plurality of buffer registers, and being interconnected to said navigation computer;
   a memory unit connected to said multiplexing unit and interconnected to said timing and synchronization unit;
   a magnetic tape control unit connected to said navigation computer, said memory unit, and said timing and synchronization unit; and
   a plurality of magnetic tape units connected to said magnetic tape control unit.

2. The system of claim 1 wherein said memory unit includes an address unit and a buffer core memory store unit.

* * * * *